Aug. 18, 1953     A. A. BERESTNEFF     2,648,957
ABSORPTION REFRIGERATION SYSTEM, INCLUDING MEANS FOR PLACING
STEAM CONDENSATE AND WEAK SOLUTION IN HEAT EXCHANGE RELATION
Filed Nov. 25, 1950
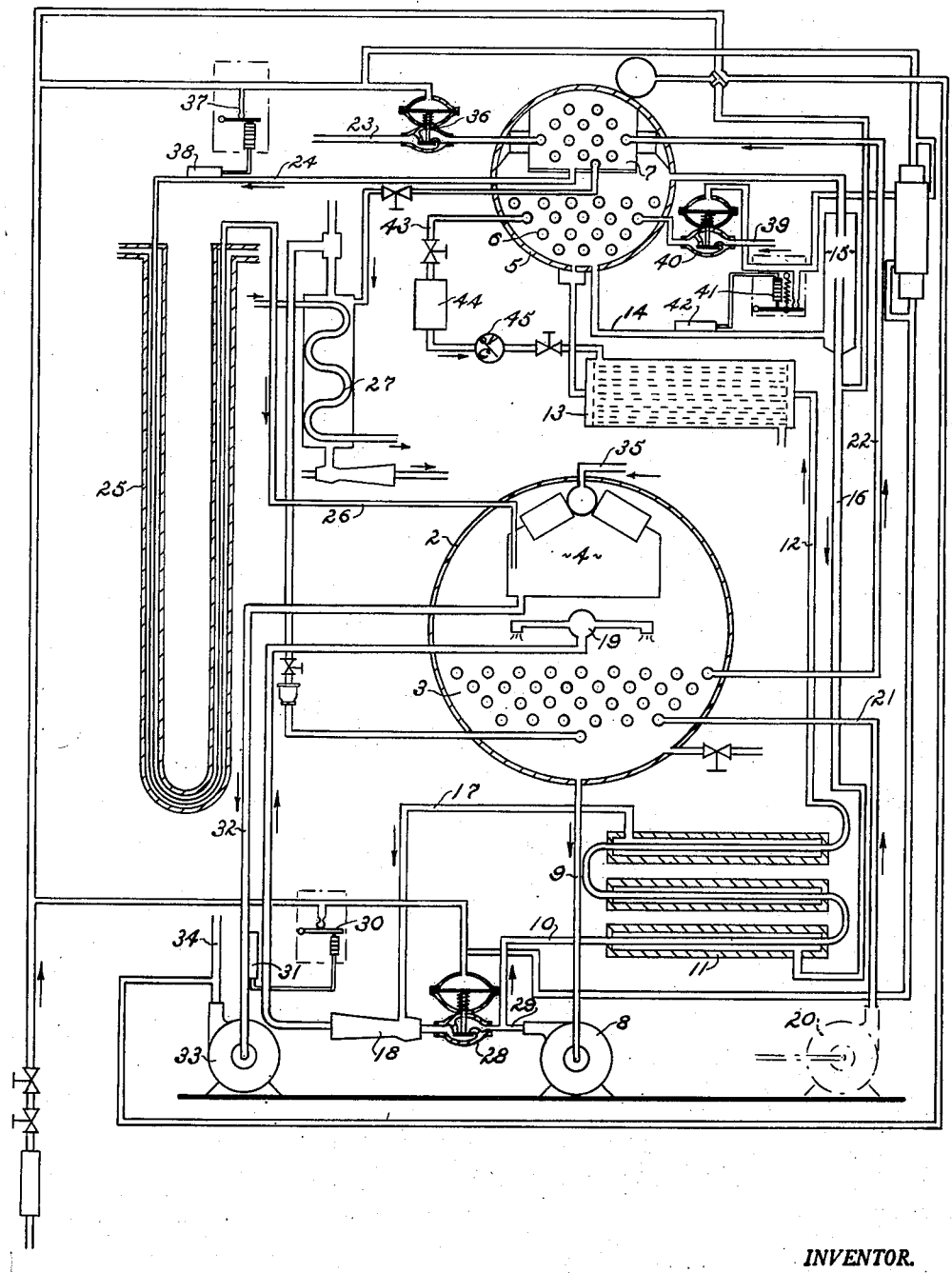
INVENTOR.
Alexis A. Berestneff
BY
Henry Puil
Atty.

Patented Aug. 18, 1953

2,648,957

UNITED STATES PATENT OFFICE 2,648,957

ABSORPTION REFRIGERATION SYSTEM, INCLUDING MEANS FOR PLACING STEAM CONDENSATE AND WEAK SOLUTION IN HEAT EXCHANGE RELATION

Alexis A. Berestneff, Syracuse, N. Y., assignor to Carrier Corporation, Syracuse, N. Y., a corporation of Delaware Application November 25, 1950, Serial No. 197,574

4 Claims. (Cl. 62—119)

This invention relates to absorption refrigeration systems and more particularly to an absorption refrigeration system including a pre-heater for heating solution passing to the generator of the system.

The chief object of the present invention is to provide an absorption refrigeration system which is economical in design and in which heat transfer in the generator is improved.

An object is to provide an absorption refrigeration system in which weak solution passage to the generator is pre-heated in order to increase the rate of heat transfer in the generator.

A further object is to provide an absorption refrigeration system employing steam as a heating medium in which the steam condensate is cooled before discharge by heat exchange with weak solution. Other objects of my invention will be readily perceived from the following description.

This invention relates to an absorption refrigeration system which includes an absorber, an evaporator, a generator, and a condenser disposed in a closed circuit. Strong solution passes from the generator to the absorber. Weak solution passes from the absorber to the generator. The weak solution passing from the absorber to the generator is pre-heated by passage in heat exchange relation with steam condensate created by passage of steam through the generator of the system. Suitable control means are provided to regulate passage of condensing water through the absorber and the condenser. If desired, suitable control means may be provided to regulate flow of solution in the system and passage of steam through the generator.

The attached drawing illustrates diagrammatically the flow diagram of an absorption refrigeration system embodying my invention.

Referring to the attached drawing, there is shown a shell 2 containing at its lower portion a plurality of tubes 3 which in cooperation with shell 2 form an absorber. A pan-like member 4 is placed in shell 2 above absorber 3 and cooperates with the shell to form an evaporator. A second shell 5 is placed above shell 2. In the lower portion of shell 5 are placed a plurality of tubes 6 which cooperate with shell 5 to form a generator. A condenser 7 is formed in shell 5 above generator 6.

A pump 8 withdraws weak solution from absorber 3 through line 9 and forwards the weak solution through line 10, heat exchanger 11, line 12, and pre-heater 13 to generator 6. Strong solution leaves generator 6 through line 14, overflow arrangement 15, line 16, heat exchanger 11 and line 17 to ejector 18 which supplies the strong solution to spray members 19 of absorber 3. Pump 8 forces a stream of weak solution through ejector 18 thereby inducing strong solution from line 17.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Pump 20 passes condensing water through line 21 to the tubes of absorber 3, condensing water, after its passage through the tubes of absorber 3, passing through line 22 to the condenser coil 7. The condensing water leaves condenser 7 through line 23.

Vapor condensate leaves condenser 7 through line 24 and passes through a pre-cooling arrangement 25, being returned to evaporator 4 through line 26. A suitable purge arrangement 27 may be provided to withdraw non-condensible gases from absorber 3 and condenser 7.

A valve 28 is placed in line 29 between pump 8 and ejector 18. Valve 28 is regulated by means of thermostatic control 30 which is actuated by a bulb 31 placed adjacent chilled-water line 32.

Pump 33 withdraws chilled water from evaporator 4 through line 32 and supplies the chilled water through line 34 to an air-conditioning device (not shown). The water returns to evaporator 4 through line 35. A valve 36 is placed in condensing water line 23. Valve 36 is regulated by a thermostatic control 37 actuated by means of a bulb 38 which is responsive to saturation temperature corresponding to the pressure within shell 5, or if desired to the temperature of condensate leaving the condenser as shown.

Steam passes through line 39 into the tubes of generator 6. A valve 40 is placed in line 39. Valve 40 is regulated by a thermostatic control 41 actuated by a bulb 42 responsive to the temperature of strong solution leaving generator 6.

Steam condensate leaves generator 6 through line 43 and passes through a steam trap 44 and a check valve 45 to pre-heater 13. The steam condensate in pre-heater 13 is placed in heat exchange relation with weak solution passing to the generator thereby raising the temperature of the weak solution toward its boiling point so as to improve fuel consumption in the generator. The condensate in pre-heater 13 is cooled to a point below its flash temperature so that the condensate may be discharged into the atmosphere. This is desirable, particularly when installation is made in large buildings since otherwise the expense of installation would be increased due to the fact that provision need be made to prevent flashing of the condensate upon dissipation in the atmosphere.

The present invention provides an absorption refrigeration system in which heat transfer in the generator is improved while fuel consumption is decreased. Heat transfer in the generator is improved because the weak solution is increased in temperature toward its boiling point thus requiring less fuel in the generator to raise the solution to boiling temperature. While the cost of the pre-heater effects a slight increase in initial cost of the machine, its use permits a considerable decrease in operating expenses.

While I have described a preferred embodiment of my invention, it will be understood my invention is not limited thereto since it may be otherwise embodied within the scope of the following claims.

I claim:

1. In an absorption refrigeration system, the combination of an absorber, an evaporator, a generator, and a condenser disposed in a closed circuit, means for circulating strong solution from the generator to the absorber, and for circulating weak solution from the absorber to the generator, means for supplying a heated vapor to the generator in heat exchange relation with solution therein thereby condensing the vapor, a line through which condensate leaves the generator, a steam trap in said line, a pre-heater for weak solution, and a second line connecting the pre-heater with the steam trap to supply condensate from the generator to the pre-heater for passage in heat exchange relation with weak solution flowing to the generator.

2. In an absorption refrigeration system, the combination of an absorber, an evaporator, a generator, and a condenser placed in a closed circuit, a line connecting the absorber with the generator, a second line connecting the generator with the absorber, a solution pump for supplying weak solution from the absorber to the generator, an ejector cooperating with the pump to supply strong solution from the generator to the absorber, means for supplying steam to the generator in heat exchange relation with the solution therein thereby condensing the steam, a line through which condensate leaves the generator, a pre-heater for weak solution, a line connecting the pre-heater with the condensate line to supply condensate to the pre-heater in heat exchange relation with weak solution flowing to the generator.

3. In an absorption refrigeration system, the combination of a shell, an element in said shell cooperating therewith to form an absorber, a second element in the shell cooperating therewith to form an evaporator, a second shell, a member in the second shell cooperating therewith to form a generator, a second member in said second shell cooperating therewith to form a condenser, a line connecting the absorber with the generator, a second line connecting the generator with the absorber, a solution pump for supplying weak solution from the absorber to the generator through said first line, an ejector cooperating with the pump to supply strong solution from the generator to the absorber through said second line, a pre-heater for weak solution connected to the generator, means for supplying steam to the generator in heat exchange relation with solution therein thereby condensing the steam, the steam condensate passing to the pre-heater, the pre-heater placing the condensate in heat exchange relation with weak solution passing to the generator.

4. An absorption refrigeration system according to claim 3 in which a heat exchanger is provided to place the strong and weak solutions in heat exchange relation.

ALEXIS A. BERESTNEFF.

References Cited in the file of this patent

UNITED STATES PATENTS

| Number | Name | Date |
| --- | --- | --- |
| 669,934 | Thoens | Mar. 12, 1901 |
| 2,287,441 | McGinnis | June 23, 1942 |
| 2,337,439 | Anderson | Dec. 21, 1943 |
| 2,465,939 | Skomp | Mar. 29, 1949 |
| 2,470,756 | Berestneff | May 24, 1949 |